United States Patent
Liu et al.

(10) Patent No.: US 11,222,441 B2
(45) Date of Patent: Jan. 11, 2022

(54) METHODS AND APPARATUSES FOR OBJECT DETECTION, AND DEVICES

(71) Applicant: BEIJING SENSETIME TECHNOLOGY DEVELOPMENT CO., LTD., Beijing (CN)

(72) Inventors: Liang Liu, Beijing (CN); Quanquan Li, Beijing (CN); Junjie Yan, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 59 days.

(21) Appl. No.: 16/734,369

(22) Filed: Jan. 5, 2020

(65) Prior Publication Data

US 2020/0143563 A1 May 7, 2020

Related U.S. Application Data

(63) Continuation of application No. PCT/CN2018/114572, filed on Nov. 8, 2018.

(30) Foreign Application Priority Data

Nov. 22, 2017 (CN) .......................... 201711175559.8

(51) Int. Cl.
  *G06T 7/73* (2017.01)
  *G06K 9/00* (2006.01)
(52) U.S. Cl.
  CPC ............ *G06T 7/74* (2017.01); *G06K 9/00805* (2013.01); *G06T 2207/30261* (2013.01)
(58) Field of Classification Search
  None
  See application file for complete search history.

(56) References Cited

U.S. PATENT DOCUMENTS

| 2012/0093407 A1 | 4/2012 | Mei |
| 2015/0055829 A1 | 2/2015 | Liang |

(Continued)

FOREIGN PATENT DOCUMENTS

| CN | 102324030 A | 1/2012 |
| CN | 102411716 A | 4/2012 |

(Continued)

OTHER PUBLICATIONS

International Search Report in the international application No. PCT/CN2018/114572, dated Feb. 3, 2019.

(Continued)

*Primary Examiner* — Leon Flores
(74) *Attorney, Agent, or Firm* — Syncoda LLC; Feng Ma

(57) ABSTRACT

A method for object detection includes: obtaining a plurality of to-be-determined targets in a to-be-detected image; determining confidences of the plurality of to-be-determined targets separately belonging to at least one category, determining categories of the plurality of to-be-determined targets according to the confidences, and determining position offset values corresponding to the respective categories of the plurality of to-be-determined targets; using the position offset values corresponding to the respective categories of the plurality of to-be-determined targets as position offset values of the plurality of to-be-determined targets; and determining position information and a category of at least one to-be-determined target in the to-be-detected image according to the categories of the plurality of to-be-determined targets, the position offset values of the plurality of to-be-determined targets, and the confidences of the plurality of to-be-determined targets belonging to the categories thereof.

16 Claims, 8 Drawing Sheets

(56) References Cited

U.S. PATENT DOCUMENTS

| | | | |
|---|---|---|---|
| 2017/0206431 A1 | 7/2017 | Sun et al. | |
| 2019/0073553 A1* | 3/2019 | Yao | G06N 3/08 |
| 2020/0143205 A1* | 5/2020 | Yao | G06K 9/6262 |

FOREIGN PATENT DOCUMENTS

| | | |
|---|---|---|
| CN | 106355188 A | 1/2017 |
| CN | 106504233 A | 3/2017 |
| CN | 106529527 A | 3/2017 |
| CN | 106778852 A | 5/2017 |
| CN | 106780612 A | 5/2017 |
| CN | 106803071 A | 6/2017 |
| CN | 107368845 A | 11/2017 |
| CN | 108229307 A | 6/2018 |
| WO | 2017175282 A1 | 10/2017 |

OTHER PUBLICATIONS

First Office Action of the Chinese application No. 201711175559.8, dated Jan. 8, 2020.

Jifeng Dai et al. "R-FCN: Object Detection via Region-based Fully Convolutional Networks", https://arxiv.org/abs/1605.06409, issued on Jun. 21, 2016.

Shaoqing Ren et al., Faster R-CNN: Towards Real-Time Object Detection with Region Proposal Networks, IEEE Transactions on Pattern Analysis and Machine Intelligence, US, IEEE, Jun. 6, 2016, vol. 39, Issue: 6, 1137-1149, URL, https://ieeexplore.ieee.org/document/7485869.

Tatstya Harada, Semantics Recognition for Handling Objects, The Journal of the Robotics Society of Japan, Japan, The Robotics Society of Japan, Jan. 15, 2017, vol. 35, No. 1, 17~21.

First Office Action of the Japanese Application No. 2020-500848, dated Apr. 20, 2021.

* cited by examiner

METHODS AND APPARATUSES FOR OBJECT DETECTION, AND DEVICES

CROSS-REFERENCE TO RELATED APPLICATIONS

The present application is a continuation of International Application No. PCT/CN2018/114572 filed on Nov. 8, 2018, which claims priority to Chinese Patent Application No. CN 201711175559.8 filed on Nov. 22, 2017. The disclosures of these applications are hereby incorporated by reference in their entirety.

BACKGROUND

In the field of computer vision such as image recognition, it is often necessary to quickly and accurately implement object detection, especially generic object detection.

Existing generic object detection typically includes an object positioning process and an object category identification process. The object positioning process is mainly used for determining a bounding box of an object in an image, and the object category identification process is mainly used for determining the category of the object.

An existing mode for implementing object positioning generally includes: obtaining a plurality of candidate boxes in the image that may be objects by means of a Selective Search algorithm or a Region Proposal Network (RPN), and then performing regression on the candidate boxes through a Convolutional Neural Network (CNN) to make the positions of the candidate boxes more precise.

An existing mode for implementing object category identification generally includes: using a CNN as a classifier for the candidate boxes determined by the object positioning process, so as to determine a confidence of each candidate box belonging to each preset category by the CNN, and using the category having the highest confidence as the category of the candidate box.

SUMMARY

The present disclosure relates to computer vision technologies, and in particular, to methods and apparatuses for object detection, electronic devices, and computer-readable storage media.

Embodiments of the present disclosure provide methods and apparatuses for object detection, and devices.

According to an aspect of the embodiments of the present disclosure, a method for object detection is provided, including: obtaining a plurality of to-be-determined targets in a to-be-detected image; determining, for at least one category, confidences of the plurality of to-be-determined targets respectively, determining categories of the plurality of to-be-determined targets according to the confidences, and respectively determining position offset values corresponding to the categories of the plurality of to-be-determined targets; respectively using the position offset values corresponding to the categories of the plurality of to-be-determined targets as position offset values of the plurality of to-be-determined targets; and determining a category and position information of at least one to-be-determined target in the to-be-detected image according to the categories of the plurality of to-be-determined targets, the position offset values of the plurality of to-be-determined targets, and the confidences of the plurality of the categories of to-be-determined targets.

According to another aspect of the embodiments of the present disclosure, an apparatus for object detection is provided, including: a to-be-determined target obtaining module, configured to obtain a plurality of to-be-determined targets in a to-be-detected image; a category and position offset value prediction module, configured to determine, for at least one category, confidences of the plurality of to-be-determined targets respectively, determine categories of the plurality of to-be-determined targets according to the confidences, and respectively determine position offset values corresponding to the categories of the plurality of to-be-determined targets; a position offset determination module, configured to respectively use the position offset values corresponding to the categories of the plurality of to-be-determined targets as position offset values of the plurality of to-be-determined targets; and a detection result determination module, configured to determine a category and position information of at least one to-be-determined target in the to-be-detected image according to the categories of the plurality of to-be-determined targets, the position offset values of the plurality of to-be-determined targets, and the confidences of the categories of the plurality of to-be-determined targets.

According to still another aspect of the embodiments of the present disclosure, an electronic device is provided, including a processor, where the processor includes the apparatus for object detection according to any one of the embodiments.

According to yet another aspect of the embodiments of the present disclosure, an electronic device is provided, including: a processor; and a memory for storing instructions executable by the processor, where execution of the instructions by the processor causes the processor to perform operations in the method for object detection according to any one of the embodiments.

According to yet another aspect of the embodiments of the present disclosure, a non-transitory computer storage medium is provided, having a computer program stored thereon, where execution of the instructions by the processor causes the processor to perform operations in the method for object detection according to any one of the embodiments.

According to yet another aspect of the embodiments of the present disclosure, a computer program product is provided, including: a computer-readable code, where when the computer-readable code runs in a device, a processor in the device executes instructions for implementing the method for object detection according to any one of the embodiments.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
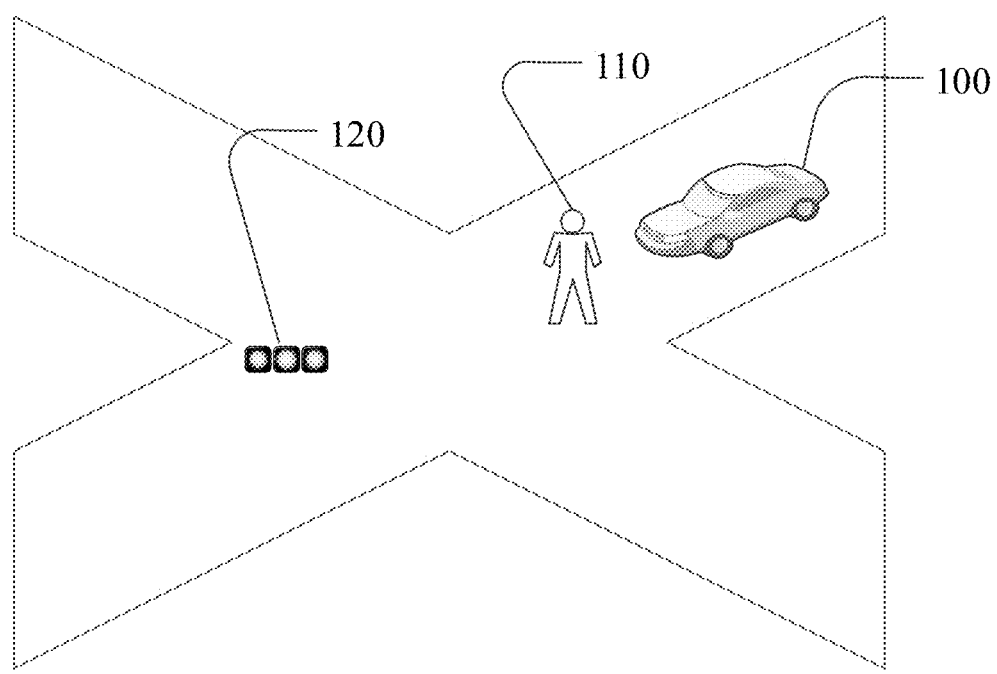
FIG. 1 illustrates a schematic diagram of an application scenario provided by embodiments of the present disclosure.

According to the methods and apparatuses for object detection and the devices provided by the foregoing embodiments of the present disclosure, in the embodiments of the present disclosure, by determining position offset values of to-be-determined targets separately with respect to each category while determining categories of the to-be-determined targets, the category determination process and the position offset calculation process may be executed in parallel, thereby reducing influences on the real-time property of object detection caused by sequential execution of the two processes; and by using the position offset values corresponding to the respective categories of the to-be-determined targets as position offset values of the plurality of to-be-determined targets, the position offset values of the to-be-determined targets may be quickly determined by a simple selection operation, thereby reducing influences on the real-time property of object detection caused by long time consumed for determining the position offset values. By means of the processes above in the present disclosure, corresponding to-be-determined targets may be quickly selected from all to-be-determined targets based on confidences, and position information of the selected corresponding to-be-determined target may be quickly and accurately determined based on position offset values thereof. In addition, in a case where three or more preset categories are included in the present disclosure, the technical solutions provided by the present disclosure may implement generic object detection. Thus, the technical solutions provided by the present disclosure are beneficial to improving the real-time property of object detection, so that the technical solutions provided by the present disclosure can be better applied to an object detection application scenario having high real-time requirements.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each section shown in the accompanying drawings is not drawn in an actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the description in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer systems/servers may be implemented in the distributed cloud computing environments in which tasks are performed by remote processing devices linked via a communications network. In the distributed computing environments, the program modules may be located in local or remote computing system storage media including storage devices.

FIG. 1 is a schematic diagram of an application scenario provided by embodiments of the present disclosure. With reference to FIG. 1, an application scenario for implementation therein according to the embodiments of the present disclosure is schematically illustrated.

In FIG. 1, an image acquisition apparatus is mounted in an automobile 100, and the image acquisition apparatus can acquire an image of a space outside the automobile 100. When the automobile 100 is in the process of automatic driving, object detection needs to be performed on the image acquired by the image acquisition apparatus to identify objects, such as a pedestrian 110, an animal, a zebra crossing, and a traffic light 120, on the road. For example, by performing object detection on the image acquired by the image acquisition apparatus, when it is determined that the traffic light 120 in front turns from green to red, the automobile 100 in the driving state is safely stopped behind a vehicle in front or behind a stop line on the road by timely controlling components such as the brake of the automobile 100; and then, when it is determined that the traffic light 120 in front turns from red to green, there is no pedestrian 110 on the front zebra crossing, and the automobile 100 is kept at a safe distance from the vehicle in front, the automobile 100 in the stopped state is enabled to continue to travel on the road by timely controlling components such as the brake of the automobile 100.

However, persons skilled in the art would fully understand that applicable scenarios of the embodiments of the present disclosure are not limited by any aspect of the framework.

Figure 2:
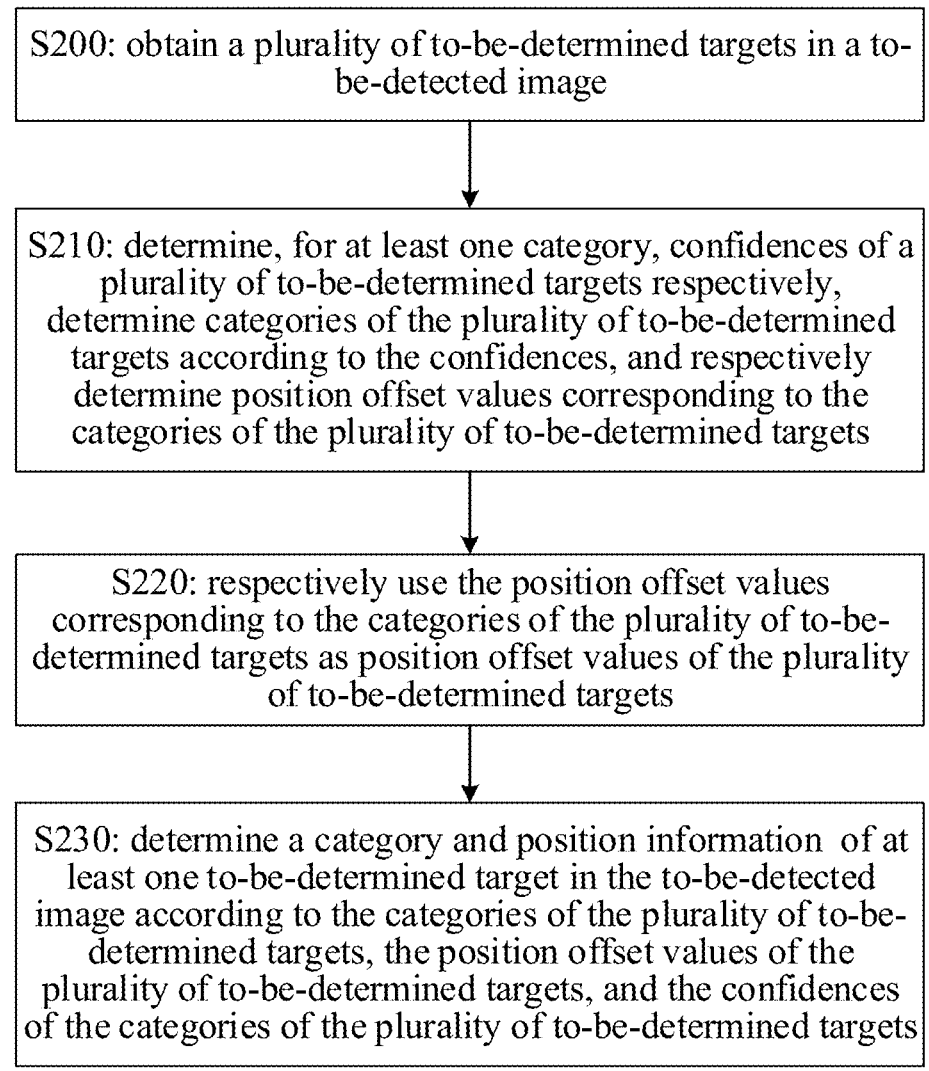
FIG. 2 illustrates a schematic flowchart of a method for object detection provided by the embodiments of the present disclosure.

The methods for object detection according to the embodiments of the present disclosure may also be referred to as methods for generic object detection. FIG. 2 is a schematic flowchart of a method for object detection provided by the embodiments of the present disclosure. The method may be performed by any electronic device, such as a terminal device, a server, a mobile device, and a vehicle-mounted device. As shown in FIG. 2, the method for object detection in the present disclosure includes: operations S200, S210, S220, and S230. The operations in FIG. 2 are separately described as follows.

S200, a plurality of to-be-determined targets in a to-be-detected image is obtained.

In an optional example, operation S200 may be performed by a processor by invoking a corresponding instruction stored in a memory, or may be performed by a to-be-determined target obtaining module 600 run by the processor.

In an optional example, the to-be-detected image in the embodiments of the present disclosure is a picture, or a frame in a video captured in real time. In the embodiments of the present disclosure, the obtaining a plurality of to-be-determined targets in a to-be-detected image may include: obtaining a plurality of to-be-determined targets formed based on at least one predetermined region size (generally a plurality of predetermined region sizes) in the to-be-detected image. In the present disclosure, the predetermined region size may be determined by preset reference box configuration information; and the to-be-determined target may be a reference box of a feature point in a feature map of the to-be-detected image, or may be a small feature map (i.e., a local feature map) formed based on the feature map of the to-be-detected image.

An example of obtaining a plurality of to-be-determined targets formed based on at least one predetermined region size in the to-be-detected image is: first, obtaining a feature map of the to-be-detected image; and then, for any feature point in the feature map, forming a plurality of reference boxes of the feature point according to preset reference box configuration information so that reference boxes of at least one feature point in the feature map can be obtained, and using each reference box of each feature point as a to-be-determined target, so as to obtain a plurality of to-be-determined targets corresponding to a plurality of feature points.

Another example of obtaining a plurality of to-be-determined targets formed based on at least one predetermined region size in the to-be-detected image is: first, obtaining a feature map of the to-be-detected image; and then pooling the feature map based on preset reference box configuration information to form a plurality of new feature maps (i.e., a plurality of small feature maps or a plurality of local feature maps), and using the plurality of new feature maps as a plurality of to-be-determined targets (for example, using each of the new feature maps as one to-be-determined target).

In the above two examples, one mode of obtaining a feature map of the to-be-detected image may be: forming a backbone network in a convolutional neural network according to the embodiments of the present disclosure by using an existing VGG16 (Visual Geometry Group) network, and providing the to-be-detected image to the backbone network so that the backbone network can output a feature map of the to-be-detected image based on VGG16 technology. Thus, in the embodiments of the present disclosure, the feature map of the to-be-detected image may be obtained based on the output of the backbone network.

In the above two examples, another mode of obtaining a feature map of the to-be-detected image may be: forming a backbone network in a convolutional neural network according to the embodiments of the present disclosure by using existing GoogleNet, and providing the to-be-detected image to the backbone network so that the backbone network can output a feature map of the to-be-detected image based on GoogleNet technology. Thus, in the embodiments of the present disclosure, the feature map of the to-be-detected image may be obtained based on the output of the backbone network.

In the above two examples, still another mode of obtaining a feature map of the to-be-detected image may be: forming a backbone network in a convolutional neural network according to the embodiments of the present disclosure by using existing ResNet, and providing the to-be-detected image to the backbone network so that the backbone network can output a feature map of the to-be-detected image based on ResNet technology. Thus, in the embodiments of the present disclosure, the feature map of the to-be-detected image may be obtained based on the output of the backbone network.

In one of the above examples, according to the embodiments of the present disclosure, the feature map output by the backbone network may be used as a final obtained feature map; or, the feature map output by the backbone network may be filtered, so as to form, based on all feature points in the feature map outputted by the backbone network, a new feature map having the same number of feature points, and the new feature map is used as a finally obtained feature map of the to-be-detected image. An implementation of the above filtering may be: setting that all the feature points output by the backbone network form a feature map; sequentially selecting, by a filter layer in the convolutional neural network, a predetermined number of feature points (for example, 9 feature points) from the feature map by using a preset sliding window (for example, a 3×3 sliding window), and forming a new feature point using each feature point selected each time; and outputting, by the filter layer, all the new feature points obtained, where all the new feature points output by the filter layer may also form a feature map, however, a region in the to-be-detected image corresponding to each feature point in the new feature map is larger than a region in the to-be-detected image corresponding to a corresponding feature point in the feature map output by the backbone network. The embodiments of the present disclosure do not limit the specific implementation process of filtering the feature map by the filter layer. In the embodiments of the present disclosure, by filtering the feature map output by the backbone network to form a new feature map, it is beneficial to improve the accuracy of position information of a determined bounding box and the category of the bounding box, thereby improving the accuracy of object detection.

In an optional example, according to the embodiments of the present disclosure, the number and sizes of reference boxes (i.e., anchors) are defined by preset reference box configuration information, that is, the number and sizes of the reference boxes are known, and the position of the reference box in the image is related to a feature point corresponding to the reference box. Generally, the sizes of a plurality of reference boxes are not completely the same, that is, the areas of the plurality of reference boxes are not completely the same. For example, the lengths of the plurality of reference boxes are different, the widths of the plurality of reference boxes are different, and the aspect ratios of the plurality of reference boxes are different.

As an optional example, in the embodiments of the present disclosure, three different lengths and three different aspect ratios are preset in the reference box configuration information, so that nine reference boxes of different shapes may be formed by the three different lengths and three different aspect ratios preset. For example, the three different lengths preset may respectively be 64, 128, and 256 (in pixels), the three different aspect ratios preset may respectively be 0.5, 1.0, and 2.0, and then nine reference boxes formed by the above three different lengths and three different aspect ratios may be represented as: 64×32, 64×64, 64×128, 128×64, 128×128, 128×256, 256×128, 256×256, and 256×512.

As another optional example, in the embodiments of the present disclosure, three different widths and three different aspect ratios are preset in the reference box configuration information, so that nine reference boxes of different shapes may be formed by the three different widths and three different aspect ratios preset.

As still another optional example, in the embodiments of the present disclosure, respective lengths and widths are respectively preset for nine reference boxes in the reference box configuration information, so that nine reference boxes of different shapes may be clearly determined.

In the present disclosure, the number of reference boxes and the size of each reference box may be set according to actual experience. The embodiments of the present disclosure do not limit the specific number of reference boxes and the sizes of the reference boxes.

S210, confidences of the plurality of to-be-determined targets separately belonging to at least one category are determined, categories of the plurality of to-be-determined targets are determined according to the confidences, and position offset values corresponding to the respective categories of the plurality of to-be-determined targets are determined.

In an optional example, operation S210 may be performed by a processor by invoking a corresponding instruction stored in a memory, or may be performed by a category and position offset value prediction module 610 run by the processor.

In an optional example of the present disclosure, confidences of the plurality of to-be-determined targets (for example, all of the to-be-determined targets) separately belonging to at least one category may be determined by one convolutional layer in the convolutional neural network, and respective categories of the plurality of to-be-determined targets may be determined according to the obtained confidences. The convolutional neural network in the present disclosure may be trained using a large number of annotated image samples. An optional example of the training process of the convolutional neural network may be found in the description below for FIG. 4, and is not repeatedly explained herein. The neural network in the embodiments of the present disclosure may include, but is not limited to, a backbone network, a filter layer and/or a pooling layer, and two convolutional layers (e.g., a first convolutional layer and a second convolutional layer).

In an optional example, according to the embodiments of the present disclosure, at least three categories are preset, for example, at least two object categories and one background category. For example, 20 object categories are preset for different kinds of objects such as a person, a dog, a train, and a chair, and a background category is preset for the background, forming a total of 21 categories. The output dimensions of corresponding convolutional layers in the convolutional neural network would be determined by the number of categories and the number of to-be-determined targets (for example, the number of reference boxes). The present disclosure does not limit the number of object categories and the specific content of objects to which the object categories are directed.

In an optional example, according to the embodiments of the present disclosure, the category of a to-be-determined target may be determined by calculating a confidence by a convolutional layer, for example, determining the category of the to-be-determined target by calculating a confidence by a convolutional layer used for predicting a confidence in an RPN or the like. For example, it is set that 21 categories are preset, namely, a first object category, a second object category, . . . , a twentieth object category, and a background category; on the basis of the setting, for a first to-be-determined target, one convolutional layer in the convolutional neural network may be used to calculate a confidence of the first to-be-determined target belonging to the first object category, a confidence of the first to-be-determined target belonging to the second object category, . . . , a confidence of the first to-be-determined target belonging to the twentieth object category, and a confidence of the first to-be-determined target belonging to the background category (21 confidences in total); by comparing the 21 confidences, a highest confidence may be determined, so that the category corresponding to a highest confidence may be used as the category of the first to-be-determined target; similarly, respective categories of a plurality of to-be-determined targets may be determined in the embodiments of the present disclosure.

In an optional example, according to the embodiments of the present disclosure, another convolutional layer in the convolutional neural network may be used to determine position offset values corresponding to the respective categories of the plurality of to-be-determined targets (for example, all of the to-be-determined targets).

In the embodiments of the present disclosure, the position offset values corresponding to the respective categories of the to-be-determined targets may be obtained by position offset values of the to-be-determined targets separately with respect to each of the at least one category.

In an optional example, the position offset value in the present disclosure is used for determining position information of a to-be-determined target when belonging to a certain category. The position offset value in the present disclosure generally includes: a top offset value, a bottom offset value, a left offset value, and a right offset value. That is, in the embodiments of the present disclosure, a convolutional layer may be used to calculate a top offset value, a bottom offset value, a left offset value, and a right offset value of a to-be-determined target with respect to each category. The top offset value represents the offset of the top edge of the to-be-determined target in a vertical direction, the bottom offset value represents the offset of the bottom edge of the to-be-determined target in the vertical direction, the left offset value represents the offset of the left edge of the to-be-determined target in a horizontal direction, and the right offset value represents the offset of the right edge of the to-be-determined target in the horizontal direction. For example, it is set that 21 categories are preset, namely, a first object category, a second object category, . . . , a twentieth object category, and a background category; on the basis of the setting, for the first to-be-determined target, one convolutional layer in the convolutional neural network may be used to calculate a top offset value, a bottom offset value, a left offset value, and a right offset value of the first to-be-determined target with respect to the first object category, a top offset value, a bottom offset value, a left offset value, and a right offset value of the first to-be-determined target with respect to the second object category, . . . , a top offset value, a bottom offset value, a left offset value, and a right offset value of the first to-be-determined target with respect to the twentieth object category, and a top offset value, a bottom offset value, a left offset value, and a right offset value of the first to-be-determined target with respect to the background category (4×21 offset values in total); similarly, top offset values, bottom offset values, left offset values, and right offset values of all of the to-be-determined targets separately with respect to the twenty-one categories may be calculated in the embodiments of the present disclosure.

It can be seen from the above description that the process of determining the categories of the to-be-determined targets and the process of calculating the position offset values of the to-be-determined targets with respect to each category in the embodiments of the present disclosure are independent of each other. Therefore, the two processes can be absolutely executed in parallel, thereby avoiding increase of time costs caused by sequential execution of the two processes, and improving the real-time property of object detection.

S220, the position offset values corresponding to the respective categories of the plurality of to-be-determined targets (for example, all of the to-be-determined targets) are used as position offset values of the plurality of to-be-determined targets (for example, respective position offset values of all of the to-be-determined targets).

In an optional example, operation S220 may be performed by a processor by invoking a corresponding instruction stored in a memory, or may be performed by a position offset determination module 620 run by the processor.

In an optional example, according to the embodiments of the present disclosure, a position offset value of one to-be-determined target may be finally determined from the above determined category of the to-be-determined target and the above calculated position offset value of the to-be-determined target with respect to the at least one category. That is, a position offset value corresponding to the determined category of the to-be-determined target is selected from the calculated position offset value of the to-be-determined target with respect to the at least one category, and the selected position offset value is used as a position offset value of the to-be-determined target. Similarly, in the embodiments of the present disclosure, position offset values of the plurality of to-be-determined targets may be determined.

As an optional example, it is set that one convolutional layer in the convolutional neural network has determined that the first to-be-determined target belongs to the first object category, and another convolutional layer in the convolutional neural network has calculated a top offset value, a bottom offset value, a left offset value, and a right offset value of the first to-be-determined target with respect to the first object category, a top offset value, a bottom offset value, a left offset value, and a right offset value of the first to-be-determined target with respect to the second object category, . . . , a top offset value, a bottom offset value, a left offset value, and a right offset value of the first to-be-determined target with respect to the twentieth object category, and a top offset value, a bottom offset value, a left offset value, and a right offset value of the first to-be-determined target with respect to the background category (4×21 offset values in total); on the basis of the settings, in the embodiments of the present disclosure, the calculated top offset value, bottom offset value, left offset value, and right offset value of the first to-be-determined target with respect to the first object category may be used as a position offset value of the first to-be-determined target; similarly, position offset values of all of the to-be-determined targets may be determined in the embodiments of the present disclosure.

S230, position information and a category of at least one to-be-determined target in the to-be-detected image are determined according to the categories of the plurality of to-be-determined targets (for example, the categories of all of the to-be-determined targets, or the categories of some of the to-be-determined targets), the position offset values of the plurality of to-be-determined targets (for example, the position offset values of all of the to-be-determined targets, or the position offset values of some of the to-be-determined targets), and the confidences of the plurality of to-be-determined targets belonging to the categories thereof (for example, the confidences of all of the to-be-determined targets belonging to the categories thereof, or the confidences of some of the to-be-determined targets belonging to the categories thereof).

In an optional example, the position information of the to-be-determined target in the present disclosure may be position information of a bounding box of the to-be-determined target. In the present disclosure, some to-be-determined targets are generally selected from the plurality of to-be-determined targets, and bounding boxes are formed using the position offset values of the selected to-be-determined targets, where the respective categories of the selected to-be-determined targets are the categories of the corresponding bounding boxes.

In an optional example, according to the embodiments of the present disclosure, some to-be-determined targets may be selected by means of a predetermined confidence requirement, where the predetermined confidence requirement may be a confidence threshold (a confidence threshold of 0.8, for example). For example, in the embodiments of the present disclosure, a to-be-determined target having a confidence exceeding the confidence threshold (e.g., greater than or equal to 0.8) may be selected from the plurality of to-be-determined targets. Then position information of a corresponding bounding box may be formed by means of the position offset value of the selected to-be-determined target, and the category of the selected to-be-determined target is used as the category of the corresponding bounding box. In addition, in the embodiments of the present disclosure, some to-be-determined targets may also be selected by means of a ratio or by means of a number threshold of bounding boxes. The embodiments of the present disclosure do not limit the specific implementation of selecting some to-be-determined targets from the plurality of to-be-determined targets.

For another example, it is set that it is determined by means of the above operations S210 and S220 that the confidence of the first to-be-determined target is 0.9, the first to-be-determined target belongs to the first object category, and the position offset value of the first to-be-determined target is y1, y2, x1, and x2; if the predetermined confidence requirement is that the confidence is not lower than the confidence threshold of 0.8, position information of a first bounding box in the image may be determined according to a region in the image corresponding to the first to-be-determined target, and y1, y2, x1, and x2, and the category of the first bounding box may be determined as the first object category.

Figure 3:
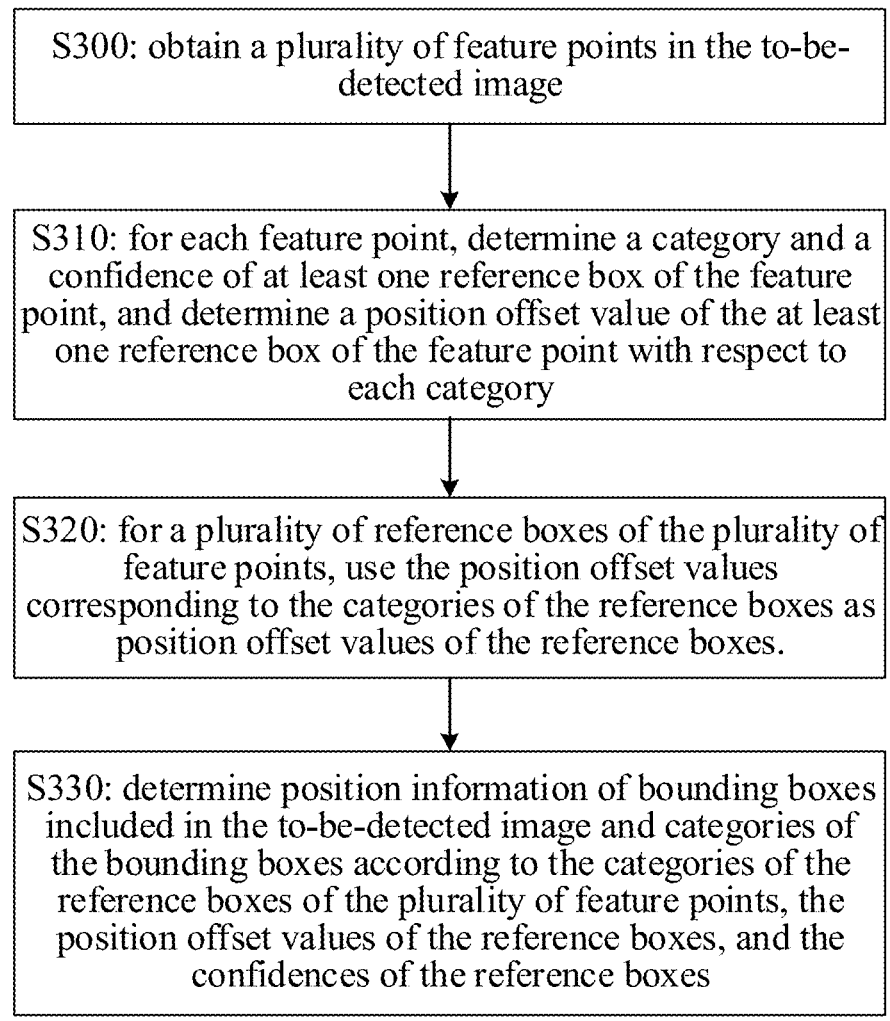
FIG. 3 illustrates another schematic flowchart of a method for object detection provided by the embodiments of the present disclosure.

FIG. 3 is another schematic flowchart of a method for object detection provided by the embodiments of the present disclosure. As shown in FIG. 3, the method for object detection in the present disclosure mainly includes: operations S300, S310, S320, and S330. The operations in FIG. 3 are separately described as follows.

S300, a plurality of feature points in the to-be-detected image is obtained. For example, feature points (i.e., all feature points) in the to-be-detected image are obtained.

In an optional example, a to-be-processed image in the embodiments of the present disclosure may be an image such as a picture or photo in a static state, or may be a video frame in a video in a dynamic state. In the embodiments of the present disclosure, feature points in the to-be-detected image may be obtained by means of various existing modes, including: forming the backbone network in the convolutional neural network in the embodiments of the present disclosure by means of existing VGG16 network or GoogleNet or ResNet, and providing the to-be-detected image to the backbone network so that the backbone network can output a plurality of feature points of the to-be-detected image based on VGG16 or GoogleNet or ResNet technology.

In an optional example, according to the embodiments of the present disclosure, the plurality of feature points output by the backbone network may be used as a plurality of finally obtained feature points of the to-be-detected image; or the plurality of feature points output by the backbone network may be filtered, so as to form the same number of new feature points based on the plurality of feature points output by the backbone network, and the plurality of new feature points are used as a plurality of finally obtained feature points of the to-be-detected image. An implementation of the above filtering may be: setting that the plurality of feature points output by the backbone network forms a feature map; sequentially selecting, by a filter layer in the convolutional neural network, a predetermined number of feature points (for example, 9 feature points) from the feature map by using a sliding window (for example, a 3×3 sliding window), and forming a new feature point using each feature point selected each time; and outputting, by the filter layer, all the new feature points obtained, where all the new feature points output by the filter layer may also form a feature map, however, a region in the to-be-detected image corresponding to each feature point in the new feature map would be larger. The present disclosure does not limit the specific implementation process of filtering the feature map by the filter layer. In the embodiments of the present disclosure, by filtering the plurality of feature points output by the backbone network to form new feature points, position information of a bounding box and the category of the bounding box can be more accurately determined, thereby improving the accuracy of object detection.

S310, for each feature point, a category and a confidence of at least one reference box of the feature point are determined, and a position offset value of the at least one reference box of the feature point with respect to each category is determined.

In an optional example, according to the embodiments of the present disclosure, the category and the confidence of the at least one reference box of the feature point may be determined by one convolutional layer in a convolutional neural network. The convolutional neural network in the embodiments of the present disclosure is trained using a large number of annotated image samples. An optional example of the training process of the convolutional neural network may be found in the description in the implementation below. The convolutional neural network in the embodiments of the present disclosure may include, but is not limited to, a backbone network, a filter layer, and two convolutional layers (e.g., a first convolutional layer and a second convolutional layer).

In an optional example, according to the embodiments of the present disclosure, the number and sizes of reference boxes (i.e., anchors) are predefined, that is, the number and sizes of the reference boxes are known, and the position of the reference box in the image is related to a feature point corresponding to the reference box. Generally, the sizes of a plurality of reference boxes are not completely the same, that is, the areas of the plurality of reference boxes are not completely the same. For example, the lengths of the plurality of reference boxes are different, the widths of the plurality of reference boxes are different, and the aspect ratios of the plurality of reference boxes are different.

As an optional example, in the embodiments of the present disclosure, three different lengths and three different aspect ratios may be preset, so that nine reference boxes of different shapes may be formed by the three different lengths and three different aspect ratios preset. For example, the three different lengths preset are respectively 64, 128, and 256 (in pixels), the three different aspect ratios preset are respectively 0.5, 1.0, and 2.0, and then nine reference boxes formed by the above three different lengths and three different aspect ratios may be represented as: 64×32, 64×64, 64×128, 128×64, 128×128, 128×256, 256×128, 256×256, and 256×512.

As another optional example, in the embodiments of the present disclosure, three different widths and three different aspect ratios may be preset, so that nine reference boxes of different shapes may be formed by the three different widths and three different aspect ratios preset.

As still another optional example, in the embodiments of the present disclosure, respective lengths and widths may be respectively preset for nine reference boxes, so that nine reference boxes of different shapes may be clearly determined.

In the present disclosure, the number of reference boxes and the size of each reference box may be set according to actual experience. The embodiments of the present disclosure do not limit the specific number of reference boxes and the sizes of the reference boxes.

In an optional example, according to the embodiments of the present disclosure, at least three categories are preset, for example, at least two object categories and one background category. For example, 20 object categories are preset for different kinds of objects such as a person, a dog, a train, and a chair, and a background category is preset for the background, forming a total of 21 categories. The output dimensions of corresponding convolutional layers in the convolutional neural network would be determined by the number of categories and the number of reference boxes. For example, if 21 categories are preset, the output dimension of a convolutional layer used for predicting a confidence in an RPN may be 21×9×h×w, where 21 denotes 21 categories, 9 denotes 9 reference boxes of one feature point, h denotes the height of the feature map, and w denotes the width of the feature map. The embodiments of the present disclosure do not limit the number of object categories and the specific content of objects to which the object categories are directed.

In an optional example, according to the embodiments of the present disclosure, the category of a reference box may be determined by calculating a confidence by a convolutional layer, for example, determining the category of the reference box by calculating a confidence by a corresponding convolutional layer used for predicting a confidence in an RPN or the like.

As an optional example, for a first feature point in the feature map, it is set that the first feature point corresponds to nine reference boxes, namely, first to ninth reference boxes, and it is set that 21 categories are preset, namely, a first object category, a second object category, . . . , a twentieth object category, and a background category; on the basis of the settings, one convolutional layer in the convolutional neural network may be used to calculate a confidence of the first reference box belonging to the first object category, a confidence of the first reference box belonging to the second object category, . . . , a confidence of the first reference box belonging to the twentieth object category, and a confidence of the first reference box belonging to the background category (21 confidences in total); by comparing the 21 confidences, a highest confidence may be determined, so that the category corresponding to a highest confidence is used as the category of the first reference box; similarly, respective categories of the first to ninth reference boxes of the first feature point may be determined in the embodiments of the present disclosure (9 categories in total); and accordingly, in the embodiments of the present disclosure, respective categories of the first to the ninth reference boxes of all feature points in the feature map may be determined (N×9 categories in total, where N is the number of feature points included in the feature map).

In an optional example, the position offset value in the present disclosure generally includes: a top offset value, a bottom offset value, a left offset value, and a right offset value. In the embodiments of the present disclosure, another convolutional layer may be used to calculate a top offset value, a bottom offset value, a left offset value, and a right offset value of a reference box with respect to each category. The top offset value represents the offset of the top edge of the reference box in a vertical direction, the bottom offset value represents the offset of the bottom edge of the reference box in the vertical direction, the left offset value represents the offset of the left edge of the reference box in a horizontal direction, and the right offset value represents the offset of the right edge of the reference box in the horizontal direction.

For example, for a first feature point in the feature map, it is set that the first feature point corresponds to nine reference boxes, namely, first to ninth reference boxes, and it is set that 21 categories are preset, namely, a first object category, a second object category, . . . , a twentieth object category, and a background category; on the basis of the settings, one convolutional layer in the convolutional neural network may be used to calculate a top offset value, a bottom offset value, a left offset value, and a right offset value of the first reference box with respect to the first object category, a top offset value, a bottom offset value, a left offset value, and a right offset value of the first reference box with respect to the second object category, . . . , a top offset value, a bottom offset value, a left offset value, and a right offset value of the first reference box with respect to the twentieth object category, and a top offset value, a bottom offset value, a left offset value, and a right offset value of the first reference box with respect to the background category (4×21 offset values in total); similarly, top offset values, bottom offset values, left offset values, and right offset values of the first to ninth reference boxes of the first feature point separately with respect to the twenty-one categories may be calculated in the embodiments of the present disclosure (9×4×21 offset values in total); and accordingly, in the embodiments of the present disclosure, top offset values, bottom offset values, left offset values, and right offset values of the first to ninth reference boxes of all feature points in the feature map separately with respect to the twenty-one categories may be determined (N×9×4×21 offset values in total, where N is the number of feature points included in the feature map).

It can be seen from the above description that the process of determining the categories of the reference boxes (i.e., operation S310) and the process of calculating the position offset values of the reference boxes with respect to the at least one category (i.e., operation S310) in the embodiments of the present disclosure are independent of each other. Therefore, the two processes can be absolutely executed in parallel, thereby avoiding increase of time costs caused by sequential execution of the two processes, and improving the real-time property of object detection.

S320, for a plurality of reference boxes of the plurality of feature points, the position offset values corresponding to the categories of the reference boxes are used as position offset values of the reference boxes.

In an optional example, according to the embodiments of the present disclosure, a position offset value of one reference box may be finally determined from the above determined category of the reference box and the above calculated position offset value of the reference box with respect to the at least one category. That is, a position offset value corresponding to the determined category of the reference box is selected from the calculated position offset value of the reference box with respect to each category, and the selected position offset value is used as a position offset value of the reference box. Accordingly, in the embodiments of the present disclosure, position offset values of the plurality of reference boxes may be determined.

As an optional example, it is set that one convolutional layer in the convolutional neural network has determined that the first reference box of the first feature point belongs to the first object category, and another convolutional layer in the convolutional neural network has calculated a top offset value, a bottom offset value, a left offset value, and a right offset value of the first reference box of the first feature point with respect to the first object category, a top offset value, a bottom offset value, a left offset value, and a right offset value of the first reference box of the first feature point with respect to the second object category, . . . , a top offset value, a bottom offset value, a left offset value, and a right offset value of the first reference box of the first feature point with respect to the twentieth object category, and a top offset value, a bottom offset value, a left offset value, and a right offset value of the first reference box of the first feature point with respect to the background category (4×21 offset values in total); on the basis of the settings, in the embodiments of the present disclosure, the calculated top offset value, bottom offset value, left offset value, and right offset value of the first reference box of the first feature point with respect to the first object category may be used as a position offset value of the first reference box of the first feature point; similarly, position offset values of the first to ninth reference boxes of the first feature point may be determined in the embodiments of the present disclosure; and accordingly, in the embodiments of the present disclosure, position offset values of first to ninth reference boxes of all feature points in the feature map may be determined (N×9 position offset values in total, namely, N×9×4 offset values, where N is the number of feature points included in the feature map).

S330, position information of bounding boxes included in the to-be-detected image and categories of the bounding boxes are determined according to the categories of the reference boxes of the plurality of feature points, the position offset values of the reference boxes, and the confidences of the reference boxes.

In an optional example in the present disclosure, some reference boxes are generally selected from the reference boxes of the plurality of feature points, and bounding boxes are formed by means of the position offset values of the selected reference boxes, where the respective categories of the selected reference boxes are categories of the corresponding bounding boxes.

In an optional example in the present disclosure, some reference boxes may be selected by means of a predetermined confidence requirement, where the predetermined confidence requirement may be a confidence threshold (a confidence threshold of 0.8, for example). As an optional example, in the embodiments of the present disclosure, a reference box having a confidence exceeding the confidence threshold (e.g., greater than or equal to 0.8) may be selected from the reference boxes of all the feature points. Then position information of a bounding box of the corresponding feature point may be formed by means of the position offset value of each selected reference box, and the category of each selected reference box is used as the category of the corresponding bounding box. In addition, in the embodiments of the present disclosure, some reference boxes may also be selected by means of a ratio or by means of a number threshold of bounding boxes. The embodiments of the present disclosure do not limit the specific implementation of selecting some reference boxes from the reference boxes of at least one feature point.

For example, it is set that it is determined by means of the above operation S310 that the confidence of the first reference box of the first feature point is 0.9, the first reference box of the first feature point belongs to the first object category, and the position offset value of the first reference box of the first feature point is y1, y2, x1, and x2; if the predetermined confidence requirement is that the confidence is not lower than the confidence threshold of 0.8, position information of a first bounding box in the image may be determined according to a region in the image corresponding to the first feature point, the length and width of the first reference box, and y1, y2, x1, and x2, and the category of the first bounding box may be determined as the first object category.

Figure 4:
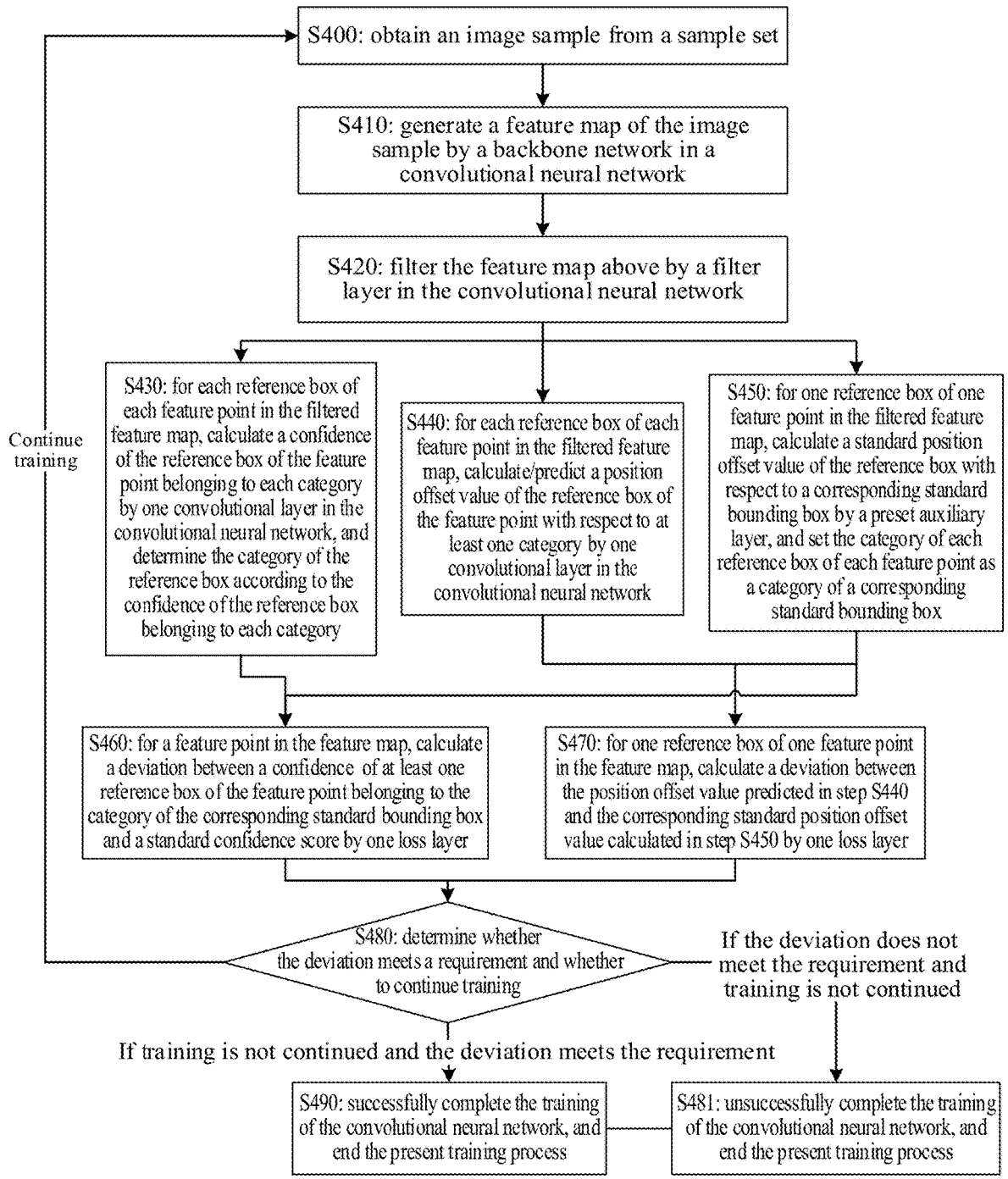
FIG. 4 illustrates a flowchart of an example of training a convolutional neural network in a method for object detection provided by the embodiments of the present disclosure.

The training process of the convolutional neural network in the present disclosure will be described below by taking a reference box of a feature point as a to-be-determined target. FIG. 4 is a flowchart of an example of training a convolutional neural network in a method for object detection provided by the embodiments of the present disclosure. As shown in FIG. 4, the training process in the embodiments of the present disclosure includes: operations S400, S410, S420, S430, S440, and S450. The operations in FIG. 4 are separately described as follows with reference to FIG. 5.

In an optional example, operations S400, S410, S420, S430, S440, and S450 included in FIG. 4 may be performed by a processor by invoking corresponding instructions stored in a memory, or may be performed by a training module run by the processor.

S400, an image sample is obtained from a sample set. The process proceeds to operation S410.

In an optional example, the sample set in the embodiments of the present disclosure is generally non-empty and generally includes a large number of image samples. The image samples in the sample set are usually annotated, for example, each of the image samples is annotated with position information of a plurality of bounding boxes and the category of a standard bounding box. Position information of a bounding box may include: two-dimensional coordinate information of two vertexes on a diagonal of the bounding box in the image sample. The image sample is typically annotated manually in advance. In the embodiments of the present disclosure, one image sample may be sequentially selected from the sample set in the arrangement order of the image samples, or one image sample may be randomly selected from the sample set.

Figure 5:
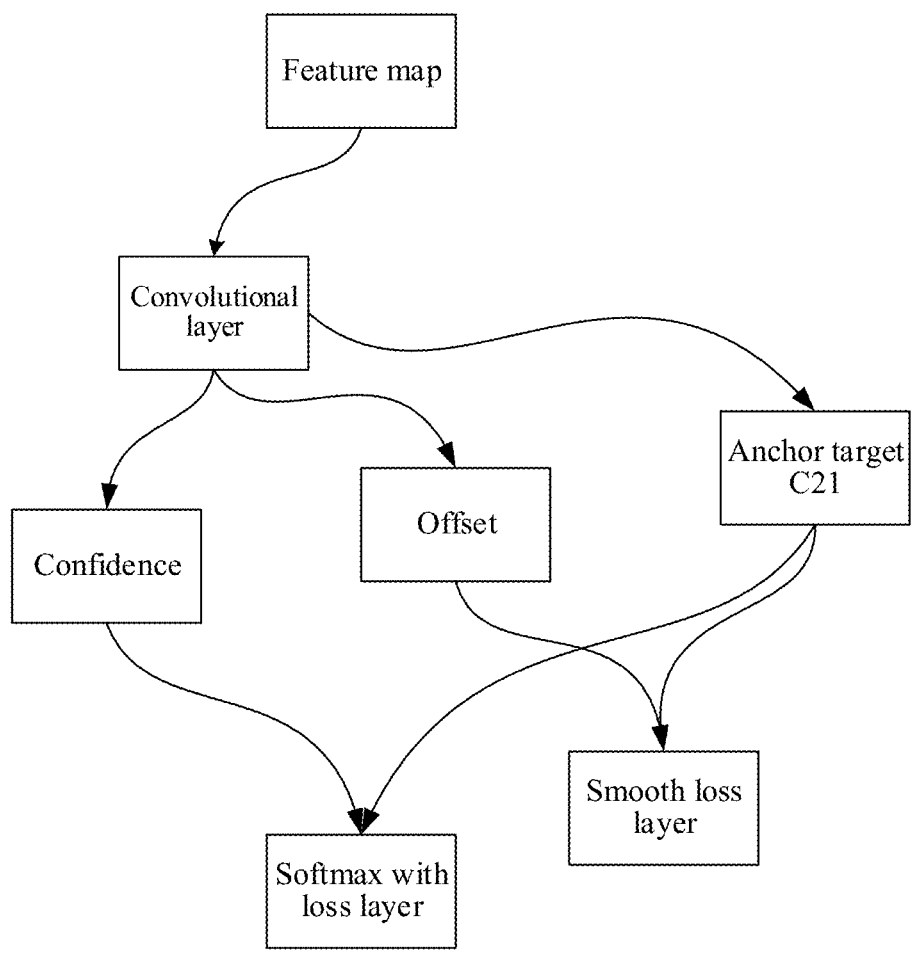
FIG. 5 illustrates a schematic structural diagram of an example of training a convolutional neural network in a method for object detection provided by the embodiments of the present disclosure.

S410, a feature map of the image sample, i.e., the feature map in FIG. 5, is generated by a backbone network in a convolutional neural network. The process proceeds to operation S420. FIG. 5 is a schematic structural diagram of an example of training a convolutional neural network in a method for object detection provided by the embodiments of the present disclosure. One or more of the operations in FIG. 4 may be understood with reference to FIG. 5.

S420, the feature map above is filtered by a filter layer in the convolutional neural network (for example, filtered by the convolutional (Conv) layer in FIG. 5), so as to convert the feature map output by the backbone network into a new feature map, where the feature map output by the backbone network and the new feature map include the same number of feature points. The process proceeds to operations S430, S440, and S450.

S430, for each reference box of each feature point in the filtered feature map, a confidence of the reference box of the feature point separately belonging to at least one category is calculated by one convolutional layer (for example, a first convolutional layer) in the convolutional neural network, for example, a confidence (cls_score) obtained by the convolutional layer in FIG. 5, and the category of the reference box is determined according to the confidence of the reference box separately belonging to the at least one category, for example, the category corresponding to a highest confidence is used as the category of the reference box. The process proceeds to operation S460.

S440, for each reference box of each feature point in the filtered feature map, a position offset value of the reference box of the feature point with respect to the at least one category is calculated/predicted by one convolutional layer (for example, a second convolutional layer) in the convolutional neural network, for example, a position offset value (loc_pred) is obtained by the convolutional layer in FIG. 5, where the predicted position offset value may include: a top offset value, a bottom offset value, a left offset value, and a right offset value. The process proceeds to operation S470.

S450, for one reference box of one feature point in the filtered feature map, a standard position offset value of the reference box with respect to a corresponding standard bounding box may be calculated by a preset auxiliary layer, for example, the auxiliary layer calculates top offset values, bottom offset values, left offset values, and right offset values of the reference box of the feature point and a standard bounding box corresponding to the feature point. In addition, categories of reference boxes of a plurality of feature points may be set as categories of corresponding standard bounding boxes by the preset auxiliary layer. The process proceeds to operations S460 and S470.

Optionally, for one reference box of one feature point, the auxiliary layer may calculate an overlap area between the reference box and at least one standard bounding box, uses a standard bounding box having a larger (for example, the largest) overlap area as a standard bounding box corresponding to the reference box, and uses the category of the standard bounding box having a larger (for example, the largest) overlap area as the category of the reference box.

Since the auxiliary layer may clearly learn about the length and width of a reference box according to preset reference box configuration information, the auxiliary layer in the present disclosure may determine the position of the reference box in the image sample according to the feature point and the length and width of the reference box. Since at least one standard bounding box in the image sample is manually annotated in advance, the auxiliary layer may learn about position information of the standard bounding box in the image sample (for example, the coordinates of two vertexes of the standard bounding box on a diagonal thereof, or the like). Accordingly, the auxiliary layer in the present disclosure may accurately and quickly calculate a position offset value of the reference box with respect to the corresponding standard bounding box (for example, the anchor target C21 obtained by the auxiliary layer in FIG. 5). The calculated position offset value is a standard position offset value, and the standard position offset value may include: a standard top offset value, a standard bottom offset value, a standard left offset value, and a standard right offset value.

It should be noted that, in the embodiments of the present disclosure, standard position offset values are calculated for some reference boxes selected from reference boxes of a plurality of feature points. That is, not all of the reference boxes are involved in the back-propagation process of deviations between position offset values in the convolutional neural network. On this basis, the auxiliary layer in the present disclosure may select a reference box, which needs calculation of a standard position offset value, according to the overlap area between the reference box and a standard bounding box. Optionally, for one reference box, the auxiliary layer may use a standard bounding box having the largest overlap area between the reference box and the standard bounding box as a standard bounding box corresponding to the reference box. Thus, the auxiliary layer may obtain the standard bounding box corresponding to the reference box. Then, the auxiliary layer may divide a plurality of reference boxes into three types according to whether the overlap area between each reference box and its corresponding standard bounding box satisfies a predetermined requirement, namely, a positive sample type (i.e., a type having an overlap area ratio greater than a first ratio threshold), a negative sample type (i.e., a type having an overlap area ratio less than a second ratio threshold), and a to-be-ignored sample type (i.e., a type having an overlap area ratio between the first ratio threshold and the second ratio threshold). Then, the auxiliary layer may select (e.g., randomly select) some reference boxes from the positive sample type and select (e.g., randomly select) some reference boxes from the negative sample type. The number of reference boxes selected by the auxiliary layer from the positive sample type and the number of reference boxes selected from the negative sample type should generally satisfy a preset ratio, for example, 3:1. Next, the auxiliary layer may annotate the selected reference boxes, such that a loss layer may subsequently calculate deviations between position offset values for the corresponding reference boxes according to the annotation.

The overlap area ratio above may be, for one to-be-determined target, if a ratio of an overlap area between the to-be-determined target and a standard bounding box thereof having a largest overlap area to an area covered by both the to-be-determined target and the standard bounding box. For example, setting that the area of a to-be-determined target A is 3, the area of a standard bounding box B corresponding to the to-be-determined target A is 4, and the overlap area between the to-be-determined target A and the standard bounding box B is 2, the overlap area ratio is 2/(3+4−2)=2/5. In the embodiments of the present disclosure, the first ratio threshold is greater than the second ratio threshold. In an optional example, the first ratio threshold is 0.7 and the second ratio threshold is 0.3. The embodiments of the present disclosure do not limit the specific values of the first ratio threshold and the second ratio threshold.

S460, for a feature point in the feature map, a deviation between a confidence of at least one reference box of the feature point belonging to the category of the corresponding standard bounding box and a standard confidence is calculated by one loss layer. As an optional example, the confidence of the at least one reference box of the feature point separately belonging to the at least one category calculated by the convolutional layer in operation S430 is transmitted to the Softmax With Loss layer in FIG. 5, and the category set by the auxiliary layer for each reference box of each feature point in operation S450 is also transmitted to the Softmax With Loss layer in FIG. 5, so that the Softmax With Loss layer can calculate a deviation between the confidence of each reference box of each feature point belonging to the category of the corresponding standard bounding box and the standard confidence according to the information transmitted from the auxiliary layer and the information transmitted from the convolutional layer, and the deviation is back-propagated by the Softmax With Loss layer to the backbone network.

S470, for one reference box of one feature point in the feature map, a deviation between the position offset value predicted in operation S440 and the corresponding standard position offset value calculated in operation S450 is calculated by one loss layer (e.g., a smooth loss layer). Optionally, the smooth loss layer may calculate a deviation between the corresponding predicted position offset value and the calculated corresponding standard position offset value according to the annotation of the auxiliary layer, and the deviation is back-propagated by the smooth loss layer to the backbone network (one iteration process is completed). The process proceeds to S480.

S480, whether the deviation meets a requirement and whether to continue training are determined, and if the deviation meets the requirement and training does not need to be continued, the process proceeds to operation S490; if training needs to be continued (regardless of whether the deviation meets the requirement), the process returns to operation S400; and if the deviation does not meet the requirement and training does not need to be continued, the process proceeds to operation S481.

In the embodiments of the present disclosure, whether to continue training may be determined by means of the number of iterations (i.e., the number of image samples that have been obtained from the image sample set), for example, if the number of iterations reaches a predetermined number, it is determined that training does not need to be continued, and if the number of iterations does not reach the predetermined number, it is determined that training needs to be continued. In the embodiments of the present disclosure, whether the deviation meets the requirement may be determined by whether the deviation is within a predetermined range, for example, if the current deviation is within the predetermined range, it is determined that the current deviation can be accepted and training of the convolutional neural network is successfully completed, and if the current deviation is not within the predetermined range, it is determined that the current deviation cannot be accepted and training of the convolutional neural network fails.

S481, the training of the convolutional neural network is not successfully completed, and the present training process is ended.

Optionally, if image samples in the sample set are all used for training or the number of samples read reaches a predetermined number but the calculated deviation still does not meet the requirement, the convolutional neural network is successfully trained although the training process is ended, and the convolutional neural network may continue to be trained subsequently.

S490, the training of the convolutional neural network is successfully completed, and the present training process is ended.

In the present disclosure, the convolutional neural network may be trained by alternately performing the deviation calculation process and the deviation back-propagation process until the calculated deviation meets the requirement, thereby successfully completing the training process of the convolutional neural network.

Further, in the present disclosure, the successfully trained convolutional neural network may also be tested. The process of testing the trained convolutional neural network is the same as the operations in the above method for object detection, and the object detection performance of the convolutional neural network in the present disclosure may be measured by calculating parameters such as Average Precision (AP) and average Recall (i.e., the percentage of bounding boxes each having an overlap ratio with the standard bounding box exceeding the predetermined threshold).

Optionally, in the present disclosure, after determining categories of reference boxes of a plurality of feature points by one convolutional layer, Non-Maximum Suppression (NMS) processing may be performed on the reference boxes, i.e., removing a reference box with an area overlap ratio exceeding a certain threshold from the reference boxes, where the area overlap ratio may be: the intersection area between two reference boxes/(the sum of the areas of the two reference boxes−the box intersection area in the intersection area between the two reference boxes), and the threshold may be 0.3 or the like; then, in the present disclosure, AP and Recall may be calculated by selecting 300 reference boxes with highest confidences from the reference boxes from which the reference box having an area overlap ratio exceeding the threshold is removed, so as to obtain the object detection performance of the trained convolutional neural network.

Persons of ordinary skill in the art may understand that: all or some operations for implementing the foregoing method embodiments may be achieved by a program by instructing related hardware; the foregoing program can be stored in a computer-readable storage medium; when the program is executed, operations including the foregoing method embodiments are executed. Moreover, the foregoing storage medium includes: various media capable of storing program codes, such as a Read-Only Memory (ROM), a Random-Access Memory (RAM), a magnetic disk, or an optical disk.

Figure 6:
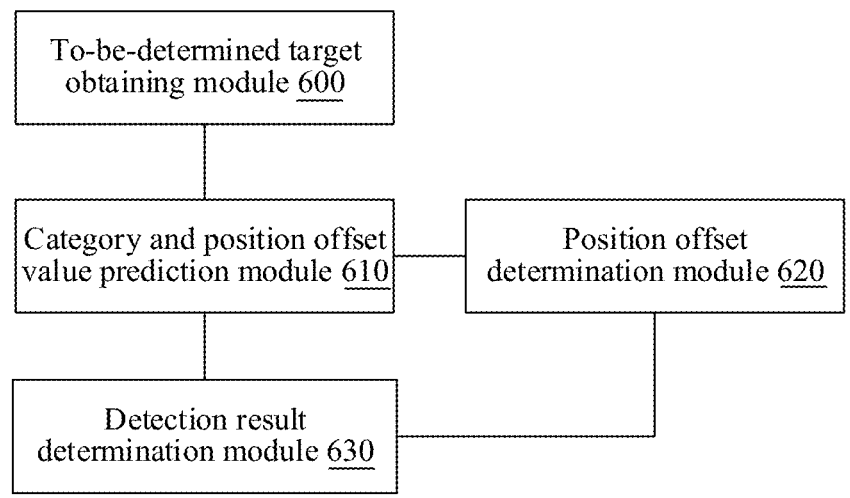
FIG. 6 illustrates a schematic structural diagram of an apparatus for object detection provided by the embodiments of the present disclosure.

FIG. 6 is a schematic structural diagram of an apparatus for object detection provided by the embodiments of the present disclosure. The apparatus of this embodiment may be used for implementing the foregoing method embodiments of the present disclosure. As shown in FIG. 6, the apparatus of this embodiment mainly includes: a to-be-determined target obtaining module 600, a category and position offset value prediction module 610, a position offset determination module 620, and a detection result determination module 630. Optionally, the apparatus may further include: a training module (not shown in FIG. 6).

The to-be-determined target obtaining module 600 is configured to obtain a plurality of to-be-determined targets in a to-be-detected image, and optionally, the to-be-determined target obtaining module 600 is configured to obtain a plurality of to-be-determined targets formed based on at least one predetermined region size in the to-be-detected image. The length of the at least one predetermined region size used by the to-be-determined target obtaining module 600 is different, the width of the at least one predetermined region size is different, and the aspect ratio of the at least one predetermined region size is different. For example, the predetermined region size includes: nine predetermined region sizes formed based on three different lengths and three different aspect ratios; or nine predetermined region sizes formed based on three different widths and three different aspect ratios; or nine predetermined region sizes formed based on three different lengths and widths.

In one embodiment, the to-be-determined target obtaining module 600 may include a first to-be-determined target obtaining sub-module, and the first to-be-determined target obtaining sub-module is mainly configured to: obtain a feature map of the to-be-detected image; for one feature point in the feature map, form a reference box of the feature point according to reference box configuration information, and use one reference box of the feature point as one to-be-determined target; and obtain a plurality of to-be-determined targets corresponding to a plurality of feature points in the feature map. The first to-be-determined target obtaining sub-module may provide the to-be-detected image to a backbone network in a convolutional neural network, and provide a feature map output by the backbone network to a filter layer in the convolutional neural network, so as to filter the feature map by the filter layer according to a preset sliding window, and the first to-be-determined target obtaining sub-module may use the filtered feature map as a feature map of the to-be-detected image.

In one embodiment, the to-be-determined target obtaining module 600 may include a second to-be-determined target obtaining sub-module, and the second to-be-determined target obtaining sub-module is mainly configured to: obtain a feature map of the to-be-detected image; and pool the feature map based on reference box configuration information to form a plurality of new feature maps, and use the plurality of new feature maps as a plurality of to-be-determined targets.

For operations executed by the to-be-determined target obtaining module 600 (such as the first to-be-determined target obtaining sub-module and the second to-be-determined target obtaining sub-module), the predetermined region size, or the like, please refer to related descriptions in operations S200 and S300 in the foregoing method embodiments. Descriptions are not made herein repeatedly.

The category and position offset value prediction module 610 is configured to: determine confidences of the plurality of to-be-determined targets separately belonging to at least one category, and determine categories of the plurality of to-be-determined targets according to the confidences; and determine position offset values corresponding to the respective categories of the plurality of to-be-determined targets. For example, the category and position offset value prediction module 610 determines, by one convolutional layer in the convolutional neural network, confidences of the plurality of to-be-determined targets separately belonging to each category, and determines categories of the plurality of to-be-determined targets according to the confidences; and the category and position offset value prediction module 610 determines, by another convolutional layer in the convolutional neural network, position offset values of the plurality of to-be-determined targets separately with respect to each category (for example, a top offset value, a bottom offset value, a left offset value, and a right offset value).

In an optional example, the category in the embodiments of the present disclosure includes: at least two object categories and one background category, for example, twenty object categories and one background category. Optionally, for one to-be-determined target, the category and position offset value prediction module 610 may calculate a confidence of the to-be-determined target separately belonging to the at least one category by one convolutional layer in the convolutional neural network, and use a category corresponding to a highest confidence as a category of the to-be-determined target. For specific operations executed by the category and position offset value prediction module 610, please refer to related descriptions in operations S210 and S310 in the foregoing method embodiments. Descriptions are not made herein repeatedly.

The position offset determination module 620 is configured to use the position offset values corresponding to the respective categories of the plurality of to-be-determined targets as position offset values of the plurality of to-be-determined targets. For specific operations executed by the position offset determination module 620, please refer to related descriptions in operations S220 and S320 in the foregoing method embodiments. Descriptions are not made herein repeatedly.

The detection result determination module 630 is configured to determine position information and a category of at least one to-be-determined target in the to-be-detected image according to the categories of the plurality of to-be-determined targets, the position offset values of the plurality of to-be-determined targets, and the confidences of the plurality of to-be-determined targets. As an optional example, the detection result determination module 630 may select, from all of the to-be-determined targets, to-be-determined targets with confidences meeting a predetermined confidence requirement, form position information of to-be-determined targets (such as position information of bounding boxes) in the to-be-detected image according to position offset values of the plurality of selected to-be-determined targets, and use categories of the plurality of selected to-be-determined targets as categories of the corresponding to-be-determined targets (such as the bounding boxes). For specific operations executed by the detection result determination module 630, please refer to related descriptions in operations S230 and S330 in the foregoing method embodiments. Descriptions are not made herein repeatedly.

The training module is mainly configured to train the convolutional neural network in the present disclosure. Optionally, the training module may obtain, from an image sample set, an image sample annotated with position information of at least one standard bounding box and the category of the standard bounding box, and obtain a plurality of to-be-determined targets formed based on at least one predetermined region size in the image sample; then the training module determines, by one convolutional layer in the convolutional neural network, confidences of the plurality of to-be-determined targets separately belonging to at least one category, and determine categories of the plurality of to-be-determined targets according to the confidences; the training module determines, by one convolutional layer in the convolutional neural network, position offset values of the plurality of to-be-determined targets separately with respect to each category, and uses the position offset values corresponding to the respective categories of the plurality of to-be-determined targets as position offset values of the plurality of to-be-determined targets; the training module calculates standard position offset values of the plurality of to-be-determined targets with respect to corresponding standard bounding boxes (for example, the training module determines standard bounding boxes having largest overlap areas respectively corresponding to the plurality of to-be-determined targets, and respectively calculates standard position offset values of the plurality of to-be-determined targets with respect to the standard bounding boxes having the largest overlap areas); the training module calculates deviations between the position offset values of all or some of the to-be-determined targets with respect to the categories of the corresponding standard bounding boxes and the corresponding standard position offset values by one loss layer in the convolutional neural network; the training module calculates deviations between the confidences of all or some of the to-be-determined targets belonging to the categories of the corresponding standard bounding boxes and the categories of the standard bounding boxes by one loss layer in the convolutional neural network, and back-propagates the deviations in the convolutional neural network; and the training module controls whether to continue training, for example, the training module determines that the training of the convolutional neural network is successfully completed if a number of image samples obtained from the image sample set reaches a predetermined number and when the deviations are within a predetermined range.

The some of the to-be-determined targets may include, but are not limited to, a positive to-be-determined target and a negative to-be-determined target, for example, the training module selects a positive to-be-determined target from all positive to-be-determined targets in all of the to-be-determined targets, and selects a negative to-be-determined target from all negative to-be-determined targets in all of the to-be-determined targets, where the positive to-be-determined target and the negative to-be-determined target selected by the training module meet a predetermined ratio. For details of the specific operations executed by the training module, the positive to-be-determined target, the negative to-be-determined target, or the like, please refer to the foregoing related descriptions for FIG. 4 and FIG. 5. Descriptions are not made herein repeatedly.

Figure 7:
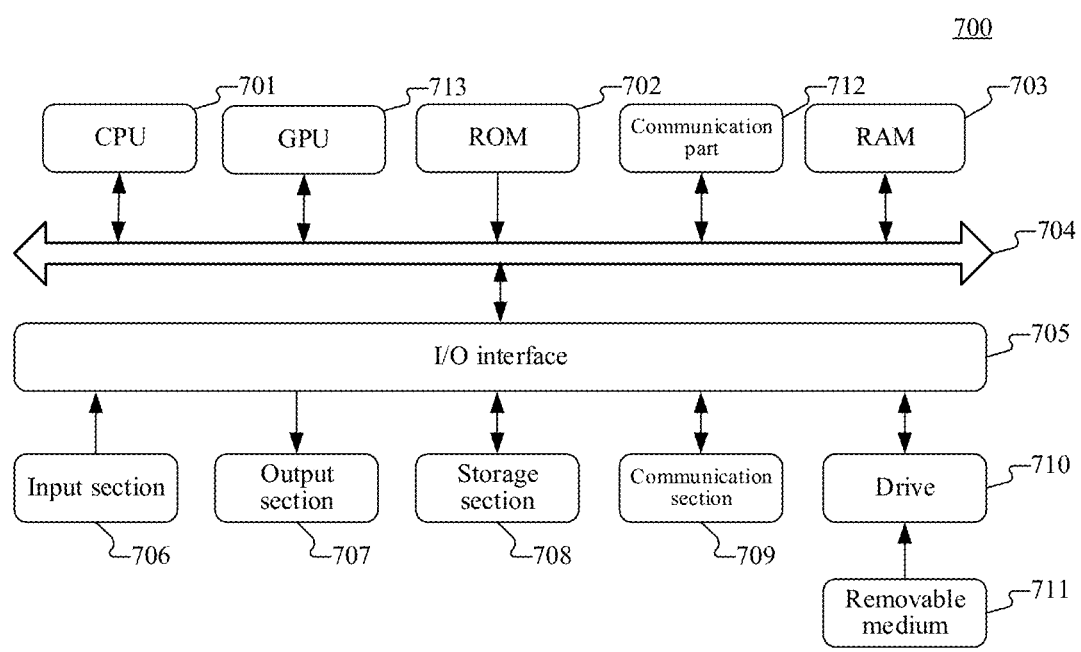
FIG. 7 illustrates a schematic structural diagram of an embodiment of an electronic device of the present disclosure.

The embodiments of the present disclosure further provide an electronic device which may be, for example, a mobile terminal, a PC, a tablet computer, a server, or the like. Referring to FIG. 7 below, a schematic structural diagram of an electronic device 700, which may be a terminal device or a server, suitable for implementing the embodiments of the present disclosure is shown. As shown in FIG. 7, the computer system 700 includes one or more processors, a communication part, and the like. The one or more processors are, for example, one or more Central Processing Units (CPUs) 701 and/or one or more Graphic Processing Units (GPUs) 713, and the processor may execute appropriate actions and processing according to executable instructions stored in a ROM 702 or executable instructions loaded from a storage section 708 to a RAM 703. The communication part 712 may include, but not limited to, a network card. The network card includes, but not limited to, an Infiniband (IB) network card. The processor may communicate with the ROM 702 and/or the RAM 730, to execute executable instructions. The processor is connected to the communication part 712 via a bus 704, and communicates with other target devices via the communication part 712, thereby implementing corresponding operations in any of the methods provided by the embodiments of the present disclosure.

In addition, the RAM 703 further stores various programs and data required for operations of an apparatus. The CPU 701, the ROM 702, and the RAM 703 are connected to each other via the bus 704. In the presence of the RAM 703, the ROM 702 is an optional module. The RAM 703 stores executable instructions, or writes the executable instructions to the ROM 702 during running. The executable instructions cause the processor 701 to execute corresponding operations of the foregoing communication method. An Input/Output (I/O) interface 705 is also connected to the bus 704. The communication part 712 is integrated, or is configured to have multiple sub-modules (for example, multiple IB network cards) connected to the bus.

The following components are connected to the I/O interface 705: an input section 706 including a keyboard, a mouse and the like; an output section 707 including a Cathode-Ray Tube (CRT), a Liquid Crystal Display (LCD), a speaker and the like; the storage section 708 including a hard disk drive and the like; and a communication section 709 of a network interface card including an LAN card, a modem and the like. The communication section 709 performs communication processing via a network such as the Internet. A drive 710 is also connected to the I/O interface 705 according to requirements. A removable medium 711 such as a magnetic disk, an optical disk, a magneto-optical disk, a semiconductor memory or the like is mounted on the drive 710 according to requirements, so that a computer program read from the removable medium is installed on the storage section 708 according to requirements.

It should be noted that the architecture shown in FIG. 7 is merely an optional implementation. During specific practice, the number and types of the components in FIG. 7 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of present disclosure include a computer program product. The computer program product includes a computer program tangibly included in a machine-readable medium. The computer program includes a program code for performing a method shown in the flowchart. The program code may include instructions for correspondingly performing operations of the method provided in the embodiments of the present disclosure. In such embodiments, the computer program is downloaded and installed from the network through the communication section 709, and/or is installed from the removable medium 711. The computer program, when being executed by the CPU 701, executes the foregoing functions defined in the methods of the present disclosure.

Figure 8:
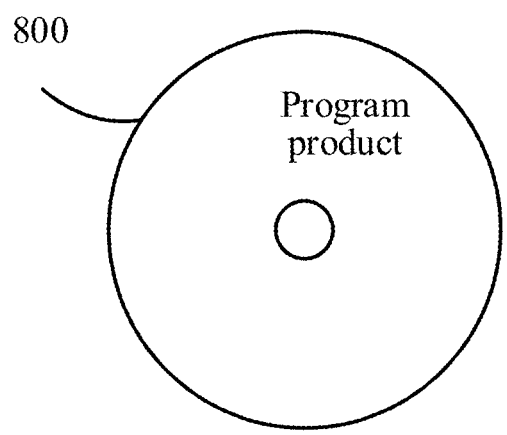
FIG. 8 illustrates a schematic diagram of an embodiment of a computer storage medium of the present disclosure.

The methods, apparatuses, and devices in the present disclosure may be implemented in many manners. For example, the methods, apparatuses, and devices in the present disclosure are implemented with software, hardware, firmware, or any combination of software, hardware, and firmware. The foregoing sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure, for example, the computer-readable storage medium 800 shown in FIG. 8.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A method for object detection, comprising:
obtaining a plurality of to-be-determined targets in a to-be-detected image;
determining, for at least one category, confidences of a plurality of to-be-determined targets respectively;
determining categories of the plurality of to-be-determined targets according to the confidences;
respectively determining position offset values corresponding to the categories of the plurality of to-be-determined targets;
respectively using the position offset values corresponding to the categories of the plurality of to-be-determined targets as position offset values of the plurality of to-be-determined targets; and
determining a category and position information of at least one to-be-determined target in the to-be-detected image according to the categories of the plurality of to-be-determined targets, the position offset values of the plurality of to-be-determined targets, and confidences of the categories of the plurality of to-be-determined targets,
wherein the operation of obtaining a plurality of to-be-determined targets in a to-be-detected image comprises:

obtaining the plurality of to-be-determined targets formed based on at least one predetermined region size in the to-be-detected image,
wherein the operation of obtaining the plurality of to-be-determined targets formed based on at least one predetermined region size in the to-be-detected image comprises:
obtaining a feature map of the to-be-detected image;
forming a reference box of a feature point in the feature map according to reference box configuration information, wherein the reference box configuration information is preset and a number and sizes of reference boxes are defined by the reference box configuration information;
using the reference box of the feature point in the feature map as one to-be-determined target; and
obtaining, respectively corresponding to a plurality of feature points in the feature map, the plurality of to-be-determined targets.

2. The method according to claim 1, wherein the operation of obtaining a feature map of the to-be-detected image comprises:
inputting the to-be-detected image into a backbone network in a convolutional neural network;
inputting a feature map output by the backbone network into a filter layer in the convolutional neural network;
filtering the feature map output by the backbone network by the filter layer according to a preset sliding window, and
using the filtered feature map output by the backbone network as the feature map of the to-be-detected image.

3. The method according to claim 1, wherein the operation of obtaining the plurality of to-be-determined targets formed based on at least one predetermined region size in the to-be-detected image comprises:
obtaining a feature map of the to-be-detected image;
pooling the feature map based on reference box configuration information to obtain a plurality of new feature maps; and
using the plurality of new feature maps as the plurality of to-be-determined targets.

4. The method according to claim 1, wherein the predetermined region size comprises: nine predetermined region sizes formed based on three different lengths and three different aspect ratios; or nine predetermined region sizes formed based on three different widths and three different aspect ratios; or nine predetermined region sizes formed based on three different lengths and widths.

5. The method according to claim 1, wherein the category comprises: two object categories and one background category.

6. The method according to claim 1, wherein the operation of determining, for at least one category, confidences of a plurality of to-be-determined targets respectively, and determining categories of the plurality of to-be-determined targets according to the confidences comprises:
for each of the plurality of to-be-determined target, calculating, for the at least one category, a confidence of the to-be-determined target respectively, and using a category corresponding to a highest confidence as a category of the to-be-determined target.

7. The method according to claim 1, wherein the operation of determining position offset values corresponding to the respective categories of the plurality of to-be-determined targets comprises:
for each of the plurality of to-be-determined target, calculating, for a category of the to-be-determined target, a top offset value, a bottom offset value, a left offset value, and a right offset value of the to-be-determined target.

8. The method according to claim 1, wherein the position information of at least one to-be-determined target comprises: position information of a bounding box of the at least one to-be-determined target.

9. The method according to claim 8, wherein the operation of determining a category and position information of at least one to-be-determined target in the to-be-detected image according to the categories of the plurality of to-be-determined targets, the position offset values of the plurality of to-be-determined targets, and confidences of the categories of the plurality of to-be-determined targets comprises:
selecting, from the plurality of to-be-determined targets, at least one to-be-determined target with confidences meeting a predetermined confidence requirement;
forming the position information of the bounding box of the at least one to-be-determined target in the to-be-detected image according to position offset value of the selected at least one to-be-determined target; and
respectively using a category of the selected at least one to-be-determined target as a category of the bounding box of the at least one to-be-determined target in the to-be-detected image.

10. The method according to claim 1, wherein the operation of determining, for at least one category, confidences of a plurality of to-be-determined targets respectively, determining categories of the plurality of to-be-determined targets according to the confidences, respectively determining position offset values corresponding to the categories of the plurality of to-be-determined targets comprises:
using a convolutional neural network to determine, for at least one category, confidences of the plurality of to-be-determined targets respectively, determine categories of the plurality of to-be-determined targets according to the confidences, and respectively determine position offset values corresponding to the categories of the plurality of to-be-determined targets; and
the method further comprises: training the convolutional neural network, wherein the operation of training the convolutional neural network comprises:
obtaining, from an image sample set, an image sample annotated with information of at least one standard position and category of the at least one standard position;
obtaining a plurality of to-be-determined targets in the image sample;
determining, for at least one category, confidences of the plurality of to-be-determined targets separately by one convolutional layer in the convolutional neural network;
determining categories of the plurality of to-be-determined targets according to the confidences;
respectively determining, by another convolutional layer in the convolutional neural network, position offset values corresponding to the categories of the plurality of to-be-determined targets;
respectively using the position offset values corresponding to the categories of the plurality of to-be-determined targets as position offset values of the plurality of to-be-determined targets;
calculating standard position offset values of the plurality of to-be-determined targets with respect to the corresponding standard position;
calculating a deviation between a position offset value of at least one of the plurality of to-be-determined targets with respect to a category of the corresponding standard position and the corresponding standard position offset value by one loss layer in the convolutional neural network, and calculating a deviation between a confidence of at least one of the plurality of to-be-determined targets with respect to the category of the corresponding standard position and the category of the standard position by one loss layer in the convolutional neural network;

back-propagating the deviations in the convolutional neural network; and completing the training of the convolutional neural network until a number of image samples obtained from the image sample set reaches a predetermined number and the deviations are within a predetermined range.

11. The method according to claim 10, wherein the operation of obtaining a plurality of to-be-determined targets in the image sample comprises:

obtaining a plurality of to-be-determined targets formed based on at least one predetermined region size in the image sample.

12. The method according to claim 10, wherein the standard position comprises:

a standard bounding box.

13. The method according to claim 12, wherein the operation of calculating standard position offset values of the plurality of to-be-determined targets with respect to the corresponding standard position comprises:

determining standard bounding boxes having largest overlap areas respectively corresponding to the plurality of to-be-determined targets; and respectively calculating standard position offset values of the plurality of to-be-determined targets with respect to the standard bounding boxes having the largest overlap areas.

14. The method according to claim 12, wherein the at least one of the plurality of to-be-determined targets comprises at least one of: at least one positive to-be-determined target selected from a plurality of positive to-be-determined targets in the plurality of to-be-determined targets, or at least one negative to-be-determined target selected from a plurality of negative to-be-determined targets in the plurality of to-be-determined targets, wherein the selected positive to-be-determined target and the selected negative to-be-determined target meet a predetermined ratio; and for one to-be-determined target, if a ratio of an overlap area between the to-be-determined target and a standard bounding box of the to-be-determined target having a largest overlap area to an area covered by both the to-be-determined target and the standard bounding box is greater than a first ratio threshold, the to-be-determined target is a positive to-be-determined target; and if the ratio is smaller than a second ratio threshold, the to-be-determined target is a negative to-be-determined target.

15. An electronic device, comprising:

a processor; and a memory for storing instructions executable by the processor;

wherein execution of the instructions by the processor causes the processor to perform:

obtaining a plurality of to-be-determined targets in a to-be-detected image;

determining, for at least one category, confidences of a plurality of to-be-determined targets respectively;

determining categories of the plurality of to-be-determined targets according to the confidences;

respectively determining position offset values corresponding to the categories of the plurality of to-be-determined targets;

respectively using the position offset values corresponding to the categories of the plurality of to-be-determined targets as position offset values of the plurality of to-be-determined targets; and determining a category and position information of at least one to-be-determined target in the to-be-detected image according to the categories of the plurality of to-be-determined targets, the position offset values of the plurality of to-be-determined targets, and confidences of the categories of the plurality of to-be-determined targets wherein the operation of obtaining a plurality of to-be-determined targets in a to-be-detected image comprises:

obtaining the plurality of to-be-determined targets formed based on at least one predetermined region size in the to-be-detected image, wherein the operation of obtaining the plurality of to-be-determined targets formed based on at least one predetermined region size in the to-be-detected image comprises:

obtaining a feature map of the to-be-detected image;

forming a reference box of a feature point in the feature map according to reference box configuration information, wherein the reference box configuration information is preset and a number and sizes of reference boxes are defined by the reference box configuration information;

using the reference box of the feature point in the feature map as one to-be-determined target; and obtaining, respectively corresponding to a plurality of feature points in the feature map, the plurality of to-be-determined targets.

16. A non-transitory computer-readable storage medium having a computer program stored thereon, wherein execution of the instructions by the processor causes the processor to perform:

obtaining a plurality of to-be-determined targets in a to-be-detected image;

determining, for at least one category, confidences of a plurality of to-be-determined targets respectively;

determining categories of the plurality of to-be-determined targets according to the confidences;

respectively determining position offset values corresponding to the categories of the plurality of to-be-determined targets;

respectively using the position offset values corresponding to the categories of the plurality of to-be-determined targets as position offset values of the plurality of to-be-determined targets; and determining a category and position information of at least one to-be-determined target in the to-be-detected image according to the categories of the plurality of to-be-determined targets, the position offset values of the plurality of to-be-determined targets, and confidences of the categories of the plurality of to-be-determined targets, wherein the operation of obtaining a plurality of to-be-determined targets in a to-be-detected image comprises:

obtaining the plurality of to-be-determined targets formed based on at least one predetermined region size in the to-be-detected image, wherein the operation of obtaining the plurality of to-be-determined targets formed based on at least one pre-determined region size in the to-be-detected image comprises:

obtaining a feature map of the to-be-detected image;

forming a reference box of a feature point in the feature map according to reference box configuration information, wherein the reference box configuration information is preset and a number and sizes of reference boxes are defined by the reference box configuration information;

using the reference box of the feature point in the feature map as one to-be-determined target; and obtaining, respectively corresponding to a plurality of feature points in the feature map, the plurality of to-be-determined targets.

* * * * *